United States Patent [19]

Brown et al.

[11] Patent Number: 4,994,667

[45] Date of Patent: Feb. 19, 1991

[54] SORTING APPARATUS WITH CONTROLLABLE WINDOWS AND FIBER OPTICS

[76] Inventors: Neville E. Brown, 1012 Kanarie Road, Randpark, Ridge Ext 7,, Randburg, Transvaal; David J. Hammond, 28 Wemmer Drive, Discovery, Florida, Transvaal; Johannes H. Potgieter, Plot 1, Treesbank, Agricultural Holdings, Zevenfontein, Transvaal, all of South Africa

[21] Appl. No.: 402,817

[22] Filed: Sep. 5, 1989

[30] Foreign Application Priority Data

Sep. 8, 1988 [ZA] South Africa ........................ 88/6679

[51] Int. Cl.[5] ................................................ G01N 9/04

[52] U.S. Cl. ............................ 250/223 R; 250/227.11; 250/358.1

[58] Field of Search ............... 250/358.1, 458.1, 459.1, 250/223 R, 226, 227.11, 227.28; 209/577, 589

[56] References Cited

U.S. PATENT DOCUMENTS

| | | | |
|---|---|---|---|
| 4,281,765 | 8/1981 | Brazell et al. | 250/223 R |
| 4,580,684 | 4/1986 | Böhme et al. | 250/359.1 |

FOREIGN PATENT DOCUMENTS

| | | |
|---|---|---|
| 1305192 | 1/1973 | United Kingdom . |
| 1568366 | 5/1980 | United Kingdom . |
| 2121535 | 12/1983 | United Kingdom . |
| 2140555 | 11/1984 | United Kingdom . |
| 2176888 | 1/1987 | United Kingdom . |
| 2211931 | 7/1989 | United Kingdom . |

*Primary Examiner*—David C. Nelms

*Attorney, Agent, or Firm*—Scully, Scott, Murphy & Presser

[57] ABSTRACT

Particles are conveyed in a stream in a direction transverse to the width of the stream. Windows view individual width zones of the stream and optical fibres are associated with the windows to convey light passing through a window to a light detector. The windows are rapidly opened and closed and a processor is provided to determine which window passed light detected by the detector and accordingly which width zone of the stream the light emanated from. The windows preferably incorporate liquid crystal shutters which can be switched rapidly between light-transmitting and opaque states corresponding to open and closed states of the windows.

9 Claims, 2 Drawing Sheets

SORTING APPARATUS WITH CONTROLLABLE WINDOWS AND FIBER OPTICS

BACKGROUND TO THE INVENTION

This invention relates to a sorting apparatus.

Most conventional apparatuses for sorting particulate material have a conveyor belt which causes the particles to move successively, usually in free flight, through an excitation zone, a detection zone and an ejection zone. To enable the apparatus to handle a large throughput, the particles are arranged in a wide monolayer on the belt, with a number of particles across the width of the belt.

In the excitation zone, the particles may, for instance, be subjected to X-radiation in a case where diamonds are to be sorted from gangue. Downstream of the excitation zone is a detection zone where a series of photomultiplier (PM) tubes are arranged across the width of the belt to detect luminescence in the particles. Further downstream, a bank of air blast ejectors is arranged. When a luminescing particle is detected at the detection zone, the appropriate ejector is actuated to issue an air blast which deflects the relevant particle out of the main stream.

To ensure that accurate detection and ejection takes place, it is essential that each PM tube and each ejector cover a small area only of the width of the falling stream of particles. If, for instance, the area "seen" by a PM tube is large, an "eject" signal could be issued when any one of a number of particles "seen" by the PM tube is luminescing. Similarly, if the ejector blasts too large an area, non-luminescing particles could also be ejected. With continuing research, the sizes of the ejectors have been decreased with the result that they are able these days to cover smaller areas than was hitherto possible. However the cost of many small PM tubes has proved to be prohibitive, and the present invention seeks to provide an alternative solution to the detection problem.

SUMMARY OF THE INVENTION

The invention provides light detection apparatus for determining which width zone of a stream of particles contains light-emitting particles, the apparatus comprising :

a) a plurality of openable and closable windows arranged across the width of the stream of particles to pass, when open, light emitted by particles in different width zones of the stream;

b) light detection means;

c) a plurality of optical fibres associated with the windows and arranged to transmit light passed by the windows to the light detection means for detection thereby;

d) means for opening and closing the windows; and e) means for determining which window passed light detected by the detection means and accordingly which width zone of the stream the light emanated from.

Preferably each window comprises a liquid crystal shutter and the opening and closing means comprises means for switching the shutters between light transmitting and opaque states corresponding to open and closed states of the windows. Preferably also each optical fibre is associated with a single window, each window can pass light from a single width zone only of the stream and the switching means operates such that only one window is open at any given moment. In a case where the stream of particles is moving in a direction transverse to the width of the stream, the windows may be in an array extending across the width of the stream and the switching means may operate such that every window is open for a portion of the time taken for a particle in the stream to pass the array.

The invention extends to a particulate material sorting apparatus which comprises light detection apparatus of the kind summarised above. The sorting apparatus may comprise means for moving the particles, in a stream, in a direction transverse to the width of the stream and separation means responsive to the processing means for separating from other particles desired particles which emit light detected by the light detection means.

Preferably, the light detection apparatus and sorting apparatus are used to sort particles, typically diamond particles, which luminesce under the effects of incident X-radiation from other particles.

BRIEF DESCRIPTION OF THE DRAWING

The invention will now be described in more detail, by way of example only, with reference to the accompanying drawings in which.

DESCRIPTION OF AN EMBODIMENT

Figure 1:
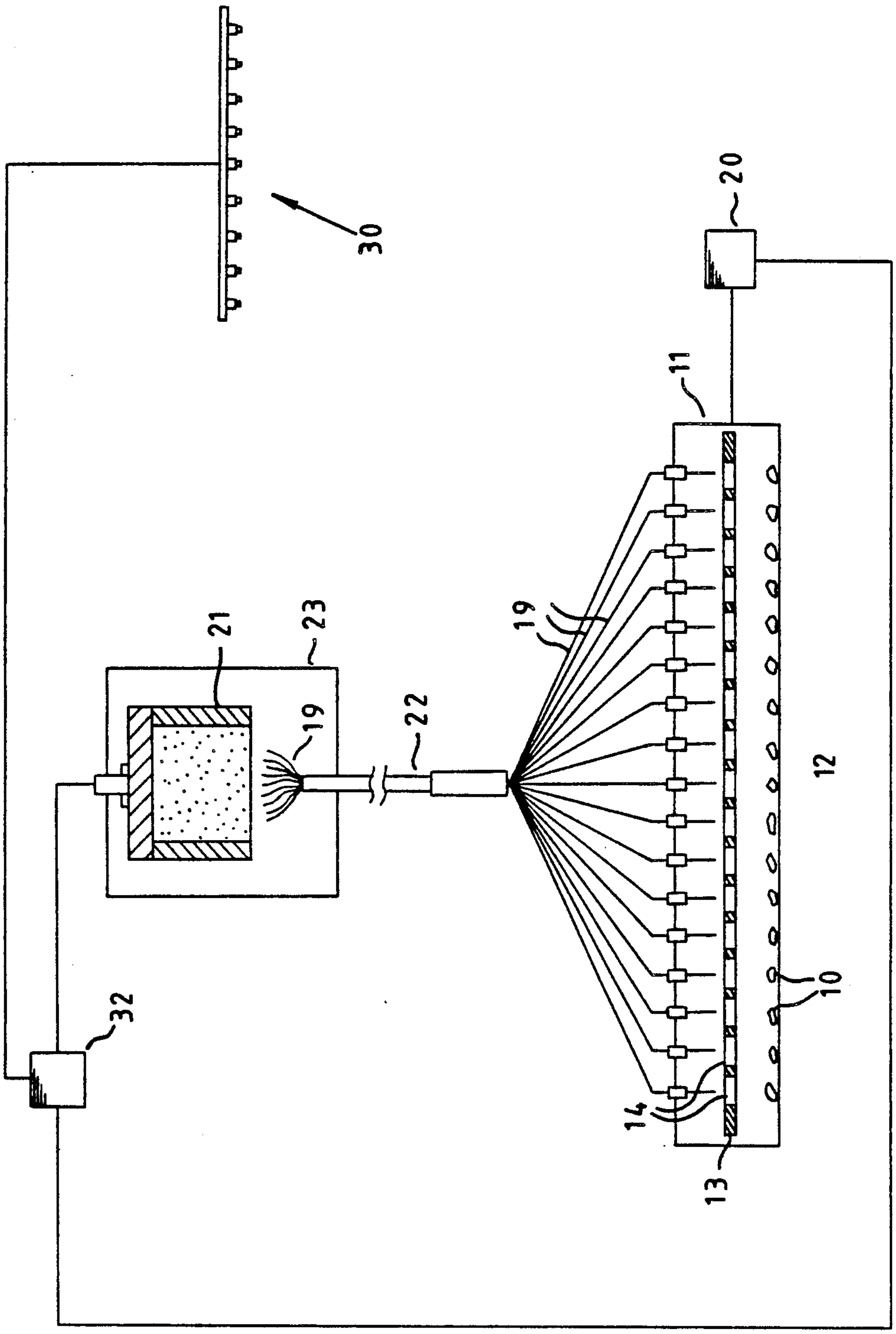
FIG. 1 illustrates an embodiment of the invention diagrammatically.

In FIG. 1 a stream of particles 10, being diamond and gangue particles, is conveyed on a belt or chute 12, the direction of movement of the stream being into the plane of the paper.

Immediately preceding its entry into an enclosure 11, the stream of particles has passed through an excitation zone where it is subjected to incident X-radiation or other excitation. Diamond particles in the stream luminesce as a result of this excitation.

Situated just above the stream of particles in the enclosure 11 is a member 13 formed with a series of windows 14 adjacent each of which one end of an optical fibre 19 is located. Each of the windows covers a small width zone of the stream and each of them is controlled by a liquid crystal shutter. The various liquid crystal shutters are connected to a control unit 20.

The unit 20 incorporates a driver unit which, at any given moment, applies a voltage to all of the liquid crystal shutters with the exception of one so that all of the shutters with the exception of that one are opaque. Thus at a given instant in time only one window 14 is open, i.e. in a light transmitting state, the remaining windows being closed, i.e. in an opaque condition preventing passage of light. The unit 20 furthermore includes the facility for rapidly changing the situation so that all liquid crystal shutters, with the exception of another shutter different to the first shutter, are opaque. In other words, there is only one window 14 which is open at any given time, the window which is open changing continuously and at an extremely rapid rate.

The optical fibres 19 are arranged in a bundle 22 which extends to a housing 23 in which a photomultiplier tube (PM) tube 21 is situated. The ends of the fibres 19 inside the housing are exposed.

If a window 14 is open, i.e. its associated liquid crystal shutter is transparent, and a particle in the relevant width zone of the stream luminesces, the open window passes the light to the associated optical fibre 19 which conveys the light by total internal reflection to the housing 23, for detection by the PM tube 21.

Figure 2:
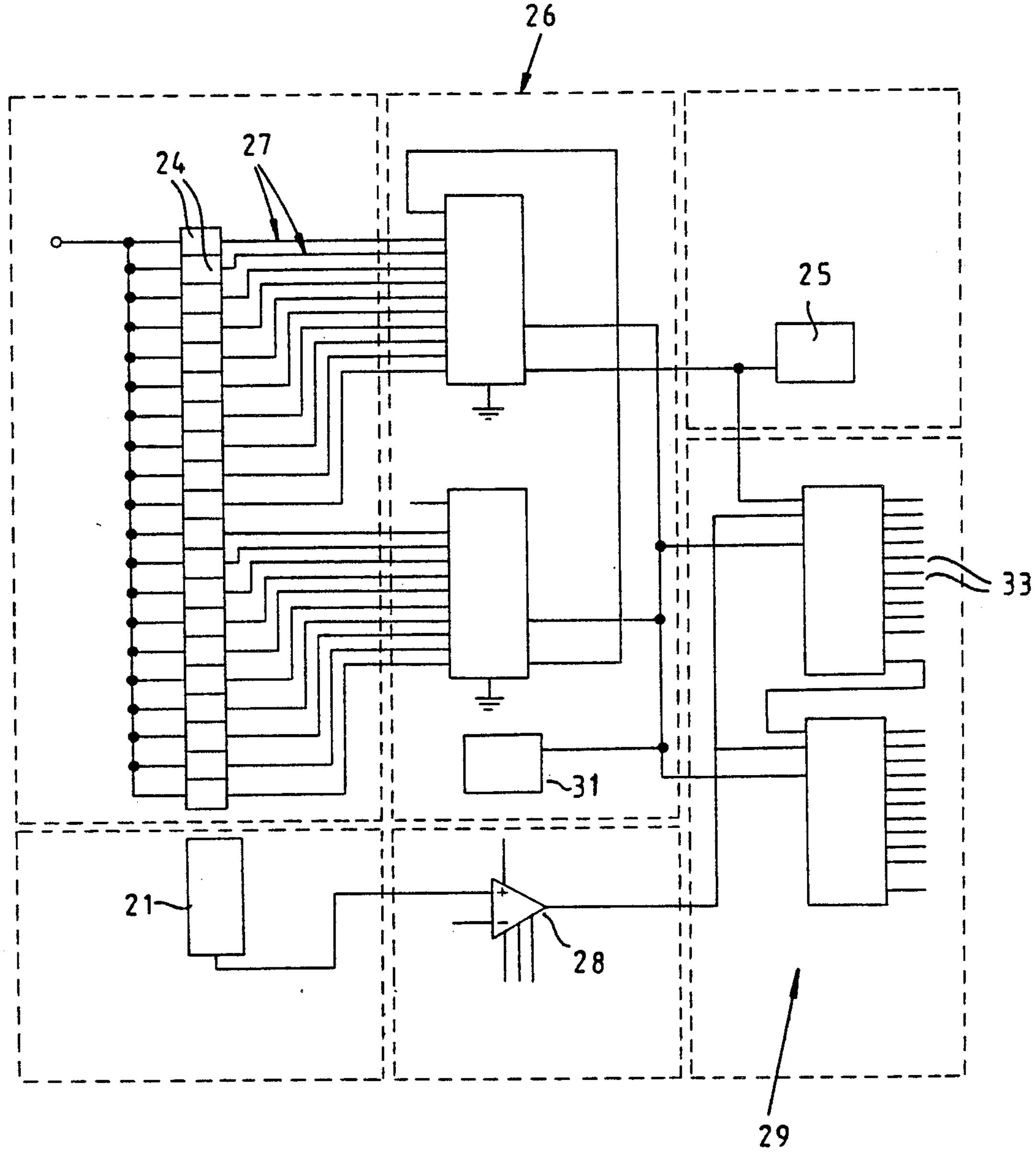
FIG. 2 is a block diagram illustrating the control circuitry.

FIG. 2 shows the electronic components of the system. A clock pulse is applied by a clock oscillator 25 to a liquid crystal drive unit 26 comprising a demultiplexed upcounter which has outputs 27 suitable for applying an appropriate voltage to the liquid crystal shutters 24 associated with the windows 14. The voltage is such as to maintain the shutters in a normal dark or opaque state. As the upcounter sequences it switches one liquid crystal shutter at a time to its transparent state, thus allowing light to pass through the relevant window 14 to the associated optical fibre 19 and, through the fibre 19, to the PM tube 21.

Upon detection of light, the PM tube sends a signal to a signal processing and decision making unit 28 which decides whether the light is indicative of a desired particle in the stream. In the appropriate cases, the unit 28 sends an enabling signal to a particle selector sequencing unit 29 comprising a second demultiplexed upcounter cycling synchronously with the driver unit 26. The outputs 33 of this counter are enabled by the signal coming from the unit 28 and are connected to a particle selector mechanism (not shown in FIG. 2). The particle selector mechanism may, for instance, comprise a bank of air blast ejectors 30 (FIG. 1) which is arranged alongside the stream of particles at a downstream location. Typically, the bank of air blast ejectors will be located alongside the stream of particles after they have been caused to fall in free flight from the belt or chute 12. Then, at the appropriate moment of time, the appropriate ejector is actuated to issue a short duration blast of air which deflects the desired particle from the falling stream for collection apart from other, undesired particles.

It will be appreciated that the units 28 and 29 constitute a means (shown diagrammatically at 32 in FIG. 1) which acts in response both to the PM tube 21 and, by virtue of the synchronous sequencing, to the instantaneous state of the driver unit 26 to make a decision about which particles are to be selected from the stream of particles. In effect, a decision is made as to which window 14 was open to pass light detected by the PM tube and accordingly which width zone of the stream contains the light-emitting particle, this decision then enabling the actuation of the correct air blast ejector 30. FIG. 2 also illustrates the presence of a reset driver 31 to ensure that the circuit starts up synchronously.

It may be necessary to provide focussing lenses and suitable collimators to ensure that light from a luminescing particle passes through the relevant window and is picked up by the associated optical fibre 19.

It is preferred that the air blast ejectors each cover the same width of the stream of particles as a lens associated with an optical fibre does. It is then possible to achieve a high degree of accuracy in the ejection zone, so that few non-luminescing particles, if any, are ejected from the stream along with luminescing particles.

Clearly, it will be necessary to switch the current supply mode to the liquid crystal shutters extremely rapidly, since if the relevant window is not open to pass light during passage of a luminescing particle, the particle will not be detected. Thus each window must be open, if only for a split second, during the time that it takes a particle to travel past the member 13.

A major advantage of the illustrated apparatus is the fact that there is a requirement for only one PM tube while it is still possible to determine in which width zone of the stream luminescence took place.

It should be noted that it would be possible to have an even greater number of windows and fibres, leading to greater accuracy in zone determination. The fibres could, as in the illustrated case, be arranged in a single bundle served by a single PM tube. Alternatively, the fibres could be in different bundles each served by a single PM tube. Even in the latter event, there will still be a relatively small number of PM tubes only.

In the illustrated case, the particles are transported through the enclosure 11 on a conveyor belt or chute 12. In other cases, the particles could be falling in free flight after projection from the end of a conveyor. Note also that the invention is not limited in any way to any particular type of separator in the ejection zone. Instead of air blast ejectors, the desired particles could, for instance, be removed from the remainder of the stream by water blasts or by suction means.

Note also that it is within the scope of the invention to use one or more PM tubes for viewing fibres which emanate from the same width zone and which are each fed with a portion of the light given off by a luminescing particle. This could be achieved, for instance, with the use of a multi-way light splitter associated with the window 14. In this case, it would be advantageous to use appropriate filters for each fibre or a single filter for the PM tube. For instance, using the suitable filter, it would be possible to detect diamonds which luminesce in the red part of the spectrum and hence to separate those diamonds from other particles.

We claim:

1. Light detection apparatus for determining which width zone of a stream of particles contains light-emitting particles, the apparatus comprising :

a) a plurality of openable and closable windows arranged across the width of the stream of particles to pass, when open, light emitted by particles in different width zones of the stream;
b) light detection means;
c) a plurality of optical fibres associated with the windows and arranged to transmit light passed by the windows to the light detection means for detection thereby;
d) means for opening and closing the windows; and
e) means for determining which window passed light detected by the detection means and accordingly which width zone of the stream the light emanated from.

2. Light detection apparatus according to claim 1 wherein each window comprises a liquid crystal shutter and the opening and closing means comprises means for switching the shutters between light transmitting and opaque states corresponding to open and closed states of the windows.

3. Light detection apparatus according to claim 2 wherein each optical fibre is associated with a single window, each window can pass light from a single width zone only of the stream and the switching means operates such that only one window is open at any given moment.

4. Light detection apparatus according to claim 3 wherein the stream of particles is moved in a direction transverse to the width of the stream, the windows are in an array extending across the width of the stream and the switching means operates such that every window is open for a portion of the time taken for a particle in the stream to pass the array.

5. A particle sorting apparatus comprising :

a) means for moving the particles, in a stream, in a direction transverse to the width of the stream;

b) a plurality of openable and closable windows arranged across the width of the stream of particles to pass, when open, light emitted by particles in different width zones of the stream;

c) light detection means;

d) a plurality of optical fibres associated with the windows and arranged to transmit light passed by the windows to the light detection means for detection thereby;

e) means for opening and closing the windows;

f) means for determining which window passed light detected by the detection means and accordingly which width zone of the stream the light emanated from; and g) separation means responsive to the processing means for separating from other particles appropriate particles which emit light detected by the light detection means.

6. A particle sorting apparatus according to claim 5 comprising a conveyor belt for moving the stream of particles past the windows.

7. A particle sorting apparatus according to claim 5 for the sorting of particles which luminesce under the effects of incident X-radiation from non-luminescing particles.

8. A particle sorting apparatus according to claim 7 for the sorting of diamond particles from other particles.

9. Light detection apparatus according to claim 1 for the detecting of light emitted by diamond particles luminescing under the effects of incident X-radiation.

* * * * *